Patented Apr. 4, 1944

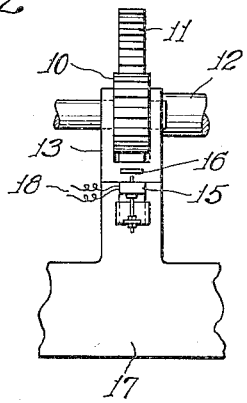
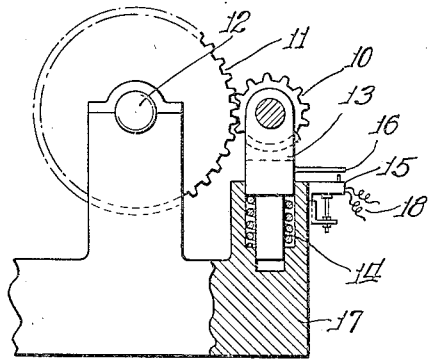
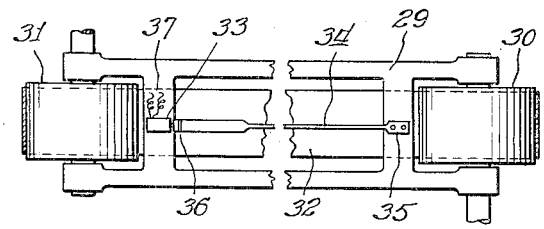
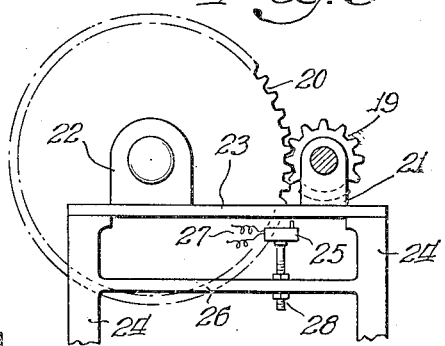
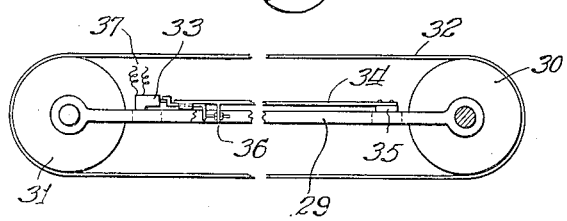

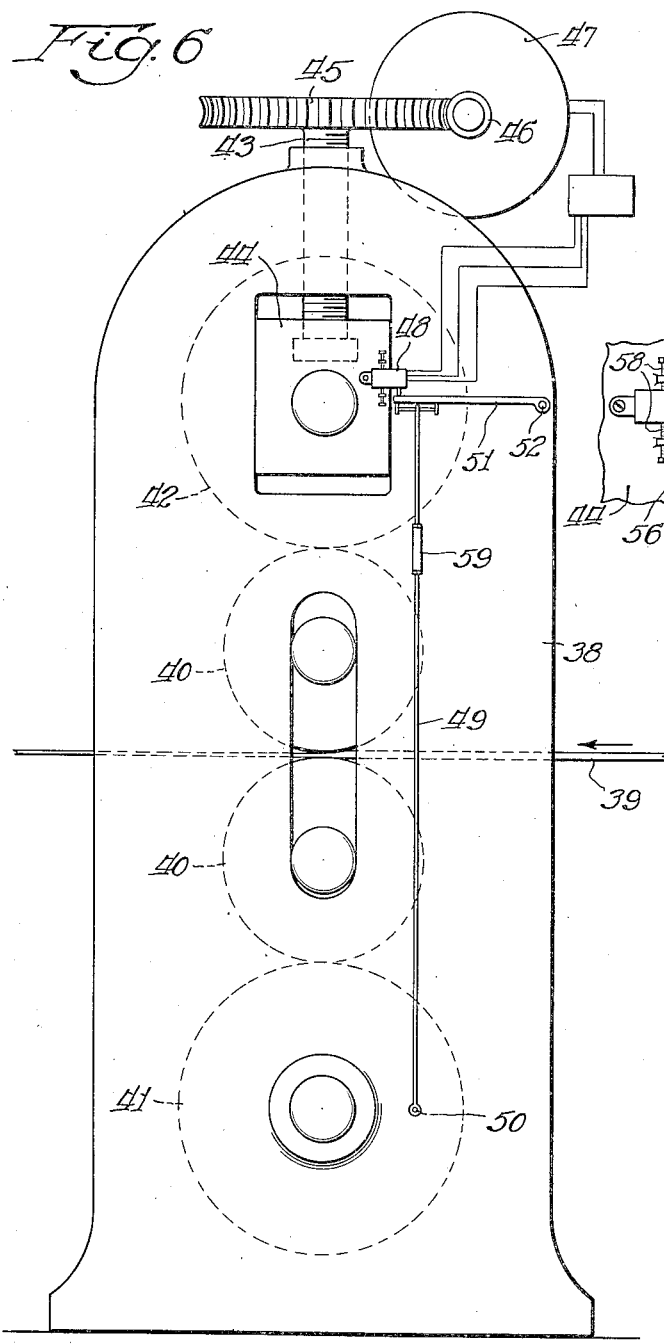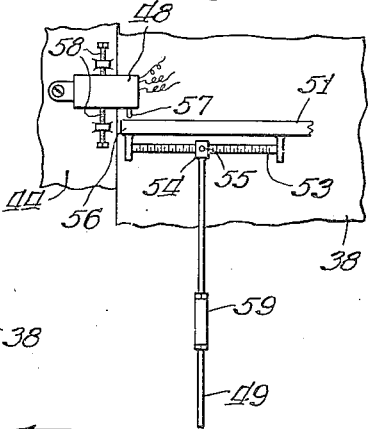

2,345,931

UNITED STATES PATENT OFFICE 2,345,931

CONTROLLING APPARATUS

Major E. Gates, Crystal Lake, Ill.

Application December 11, 1941, Serial No. 422,477

2 Claims. (Cl. 80—56)

This invention relates to devices for controlling the operation of machines which consume or generate power in their use and, among other objects, aims to provide a simple and inexpensive device which may be easily applied to existing machines to protect the same or parts thereof from overstrain or otherwise to regulate the operation of the machine.

The invention may be readily understood by reference to illustrative devices applied to typical apparatus and shown in the accompanying drawings.

In said drawings:

Fig. 1 is an elevation partly in section of a device applied to a bearing support subject to strain in the transmission of power;

Fig. 2 is a side view of the apparatus shown in Fig. 1;

Fig. 3 is an elevation of a similar apparatus showing the device applied to a plate which is stressed during transmission of power;

Fig. 4 is a plan view illustrating the device applied to the support for pulleys and a belt or other similar flexible element for transmitting power;

Fig. 5 is a side elevation of the apparatus of Fig. 3;

Fig. 6 is an elevation of a roll stand in a sheet rolling mill equipped with the illustrative device for regulating the operation of the rolls; and Fig. 7 is an enlarged view of a portion of the regulating device in Fig. 6.

The illustrative devices regulate the operation of apparatus to which they are applied to prevent overstrain in some part or parts thereof or to minimize other undesired deviation from or irregularities in normal or desired operation of the apparatus. One example of the latter regulation selected for illustration is the control of roll spacing in rolling mills to minimize departures from a given sheet thickness.

To prevent overstrain in some part or parts of a machine or apparatus, the device is attached to a member or element of the apparatus which responds to the working stresses in the apparatus. For example, a bearing support through which power is transmitted would yield under the operating pressure in accordance with Hooke's law. The yield may be very slight but it nevertheless occurs and can be utilized to protect against overstrain in that part or some related part of the apparatus. Likewise some structural member of the apparatus under tension, compression, torsion, or bending will yield responsively to the load thereon. This yielding, though very slight, may be utilized to prevent overstrain.

In most apparatus it is not possible to prevent overstrain in some part by reference to the total power consumed or delivered by the apparatus. Small or minor elements may be overstrained to failure without causing any indication of excessive consumption or delivery of power. This is because the load on such element may be only a very small fraction of the total force or power involved in the operation of an apparatus as a whole. Yet failure of some small part may be just as serious as the failure of a large element of the apparatus.

The applications of the invention selected for illustration are typical only and obviously are only a partial illustration of the various ways in which the device may be used. In Fig. 1, for example, the device is applied to protect overstrain in a shaft or some element driving or driven by the shaft. If some element driven by the shaft were over-stressed, failure could occur without indication of excessive consumption or delivery of power. In the present case, a pair of gears, the pinion 10 and gear 11, form a part of the train through which power is delivered to shaft 12. The shaft 12 may deliver power to any conceivable type of machine or apparatus. The stress or torsion in shaft 12 will be reflected in the pressure of the gear teeth of gears 10 and 11 and correspondingly in the supports for the gear bearings. In the present instance the bearing support 13 for gear 10 is shown on a heavy spring 14 which is adapted to yield proportionally to the pressure on the gear teeth and the degree of yield is a measure of the torsion in shaft 12. Excessive yielding of the bearing support 13, representing excessive torsion in shaft 12 causes operation of the controlling device to cut off power and stop the machine.

The controlling device is here shown in the form of a microswitch 15 which is actuated by a projection 16 on the bearing support when a predetermined yielding of the bearing support has been reached. The microswitch in turn actuates appropriate relays for cutting off power. The microswitch is simply illustrative of other forms of switches which may be employed. It is advantageous in this instance because it may be actuated by a very slight movement. Switches of this character may be purchased on the market. The details thereof are disclosed in United States Patents Nos. 1,960,020 and 2,172,673. These switches require a movement as little as .0002 of an inch to switch the contact points from open to closed position and vice versa. The switch is adjustably mounted on a stationary part 17 of the bearing support so that it may be moved toward and away from projection 16 for purposes of regulation. Under stress relative movement occurs between the bearing support 13 and the stationary member 17. The position of the switch 15 is adjusted relative to the projection 16 so as to be actuated when a predetermined yielding of the bearing support occurs. Wires 18 lead from the microswitch to relays for controlling the operation of the main power switch for the apparatus. Such relays are conventional and do not require illustration.

It is not essential that the bearing support be given a special mounting. However, on standard bearing supports the yielding thereof under stress is very slight and may require some multiplication by the use of extensometer levers to operate the microswitch. The yielding of the bearing may be in the form of either a simple compression or bending or a combination of both. An extensometer is employed simply to increase or multiply whatever yielding occurs so as to effect the operation of the switch. The multiplication need not be great since a microswitch itself will operate with a very slight movement.

In Fig. 3 is illustrated another manner of utilizing the yielding of bearing supports to protect against excessive stress in shafts and other elements which transmit power delivered from the gears. Here also a pinion 19 is shown driving gear 20. The respective bearing supports 21 and 22 are shown mounted on a metal plate 23 carried on supporting members 24. This is a typical arrangement found in many machines. The plate 23 will, of course, flex in response to the reaction on bearing supports 21 and 22 in transmitting power and the degree of flexure represents the torsion in the shaft or stress in any other element driven by gear 20. A microswitch 25 is mounted on the fixed support 26 in such position as to be operated when flexure in plate 23 reaches a predetermined maximum. In this instance there will be a compound flexure in plate 23, the reaction of one gear support being upward and the other downward. For this reason, the microswitch should not be located opposite a neutral point in the plate. Wires 27 run from the microswitch to relays for operating the main switch. The microswitch is provided with an adjustment 28 by means of which its position relative to plate 23 may be adjusted.

In Figs. 4 and 5, the controlling device is shown applied to a support 29 for pulleys 30 and 31 between which power is transmitted by a belt 32 or other flexible element. The belt 32 may be a conveyer belt or simply a device for transmitting power. The stress in the belt causes longitudinal compression in support 29. Regardless of how massive the support 29 is, it will nevertheless yield slightly under Hooke's law in response to the varying stress in the belt. This variation in length is utilized to operate a microswitch 33 by means of an extensometer rod 34 when the compression in the support 29 reaches a predetermined maximum. The extensometer rod is connected at one end 35 to a remote part of the support 29 and its other end is located adjacent the button of the microswitch 33. The latter end is made adjustable as at 36 for purposes of regulation so that operation of the switch will occur upon the desired compression in the support 29. In the present case the support 29 is of sufficient length so that the compression occurring in the distance between the point of connection of the microswitch 33 and the connection 35 of the extensometer rod exceeds the movement necessary for operation of the microswitch. For shorter supports this movement may be multiplied by the use of a multiplying extensometer lever.

As in the other installations described, the wires 37 from the microswitch lead to relays which control the main power switch.

In Figs. 6 and 7 is illustrated the application of the control device for regulating the operation of apparatus to minimize deviation from desired or normal operation. It is here shown applied to continuous rolling apparatus represented by rolls in a sheet rolling mill to minimize deviation from desired sheet thickness. Such deviation occurs because of the varying stresses to which the frame 38 of the roll stand is subjected by varying conditions of the sheet 39 passing through the same. If the sheet be thinner, hotter, or more malleable than normal, it will require less force to reduce it in passing through the rolls with the result that the stress or stretch in the frame 38 and compression of the rolls themselves will not be so great and therefore will cause the rolls 40 to approach more closely than normal. On the other hand, if the sheet be colder, less malleable, or thicker than normal, it will require a greater than normal pressure from rolls 40 in reducing the same with the result that the roll stand frame 38 will be under greater than normal stress and will be stretched apart a few thousandths of an inch greater than normal and the rolls will be more compressed with the result that the spacing of rolls 40 will be greater by a few thousandths of an inch than normal spacing.

Despite the fact that the roll stand frames 38 are exceedingly massive and strong, they nevertheless stretch according to Hooke's law and this stretch, coupled with the compression in the rolls themselves, causes variation in roll spacing of a few thousandths of an inch, sufficient to be reflected in variations in sheet thickness. For many operations to which sheet metal is subjected, such as drawing, it is of the greatest importance that the sheet be of uniform thickness. Excessive thickness produces excessive wear on dies and insufficient thickness results in insufficient metal for the drawing operation, resulting in a defective article which must be scrapped.

Fig. 6 illustrates diagrammatically a typical roll stand in a rolling mill. The main rolls 40 are backed up by outer rolls 41 and 42, one of which, in this case the upper one, is adjustable to vary the roll spacing. Adjustment in this instance is effected by rotating adjusting screws 43 to move the respective upper roll bearings 44 up or down in the frame. Each adjusting screw is here shown operated by a gear 45 and worm 46, the latter being rotated by a reversible motor 47.

As here shown, the microswitch 48, which in this case is a double throw switch, is mounted on the bearing 44 and moves up and down therewith. Stretch in the roll frame 38 is communicated to the microswitch by the extensometer rod 49 connected at 50 to a point near the bottom of the frame. The free end of the extensometer rod controls the operation of the microswitch. In order to take into account the fact that the rolls 40 themselves also are compressed slightly under the stress and this compression varies with the degree of stress, the relative movement between the end of extensometer rod 49 and the microswitch is modified by means of lever 51. The latter is pivoted to the roll frame at 52 and is provided with means for adjusting the pivotal connection of extensometer rod 49 thereto. In the present case this is shown in the form of a graduated bar 53 which passes through a lead 54 in the extensometer rod, the latter carries a set screw 55 to set the adjustment. Thus the free end 56 of the lever which operates the micrometer switch button 57 slightly multiplies the stretch in the roll frame by an amount which approximates the compression in the rolls themselves.

The extensometer switch is adjustably mounted on bearing 44 so that its position relative to lever 51 may be regulated. The adjusting means is here shown in the form of screws 58. The microswitch is advantageously a double throw switch which in its lower position will operate motor 47 to rotate it in one direction and in its upper position will rotate motor 47 in the opposite direction. In its intermediate position, that is between upper and lower positions, it is open or neutral. In the present case when the distance between the end 56 of lever 51 and microswitch increases, the microswitch operates to rotate motor 47 so as to lower roll bearing 44, that is, to reduce the roll spacing.

Two single throw switches on opposite sides of lever 51 may be substituted for the double throw switch 48.

When the stretch in frame 38 exceeds that represented by normal sheet thickness, end 56 of lever 51 is moved slightly away from microswitch 48 with the result that the motor is operated to move bearing 44 downwardly, carrying with it the microswitch, until normal relationship is restored and the microswitch is brought to neutral. Reduction in stress in the roll frame 38 produces the opposite result, that is, motor 47 is rotated so as to raise roll bearing and increase the roll spacing until the normal relationship between lever 51 and microswitch 48 is restored.

Extensometer rod 49 is advantageously made adjustable in length, as at 59, to permit ample elongation or reduction in length to accommodate the device to any desired roll spacing. If desired, an independent control device may be connected with the opposite roll bearing so that its adjustment will be controlled by the stresses in the roll frame on that side. This will make the apparatus sensitive to variations in condition of the sheet which occur at one side but not on the other.

In a similar machine other apparatus may be controlled to minimize deviation of its operation from normal.

Obviously the invention is not limited to the details of the illustrative device since these may be variously modified. Moreover, it is not indispensable that all features of the invention be used conjointly since various features may be used to advantage in different combinations and sub-combinations.

Having described my invention, I claim:

1. In apparatus for rolling sheets or the like, the combination with rolls and roll frame of mechanism for adjusting the roll spacing of electric switch means for controlling the operation of said mechanism, said roll frame being elastic and assuming the stresses developed in operation of said apparatus and elastically strained thereby, an extensometer connected to said roll frame and responsive to the strains therein for actuating said switch, said extensometer also being connected with said mechanism so that reduction of roll spacing counteracts the effect on said extensometer of elongation of said frame and vice versa, and means for relatively adjusting said extensometer and switch means to operate said mechanism to reduce roll spacing when elongation of said frame exceeds normal and to increase roll spacing when elongation of said frame is less than normal.

2. In a sheet rolling mill the combination comprising a roll frame having rolls one of which is adjustable to vary the roll spacing, mechanism for shifting said adjustable roll to vary the spacing, electric switch means for controlling the operation of said mechanism, an extensometer controlling said switch means and connected to said frame and responsive to elongation and contraction of the frame under the stress of the rolls, means for connecting said extensometer with said adjustable roll so that response of the extensometer to reduction of roll spacing is in opposition to its response to elongation of said frame and vice versa, and means for relatively adjusting said extensometer and said switch means so that said mechanism varies the roll spacing inversely with that caused by elongation of said roll frame.

MAJOR E. GATES.